Feb. 17, 1942.  G. E. DAVISON  2,273,179
ROTARY VALVE AND LUBRICATION THEREOF
Filed Aug. 30, 1940  3 Sheets-Sheet 1
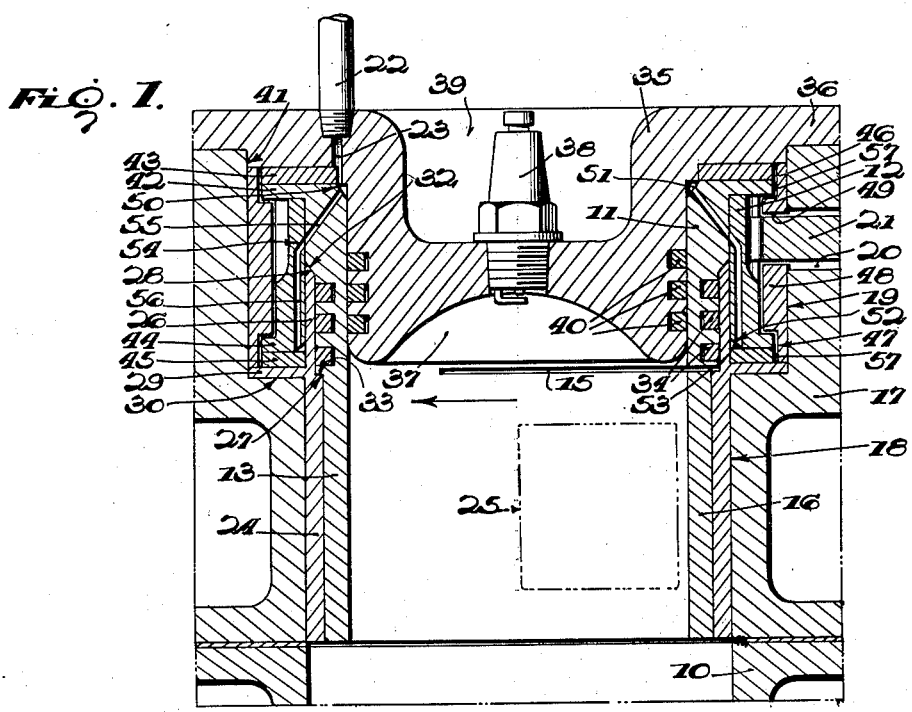
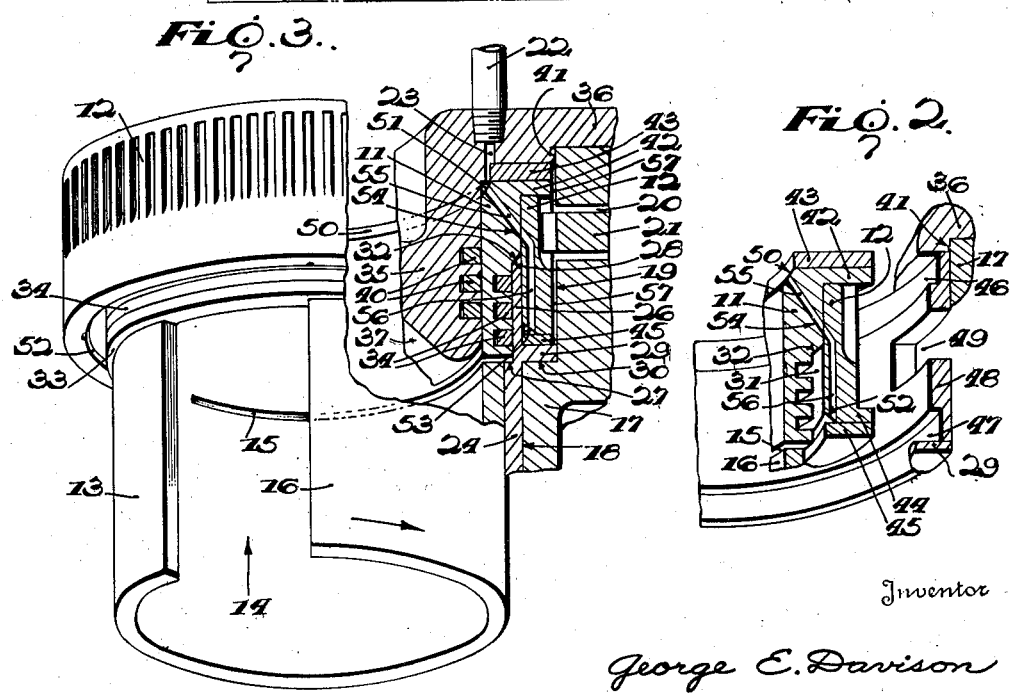
Inventor
George E. Davison
By Cameron, Kerkam & Sutton
Attorneys

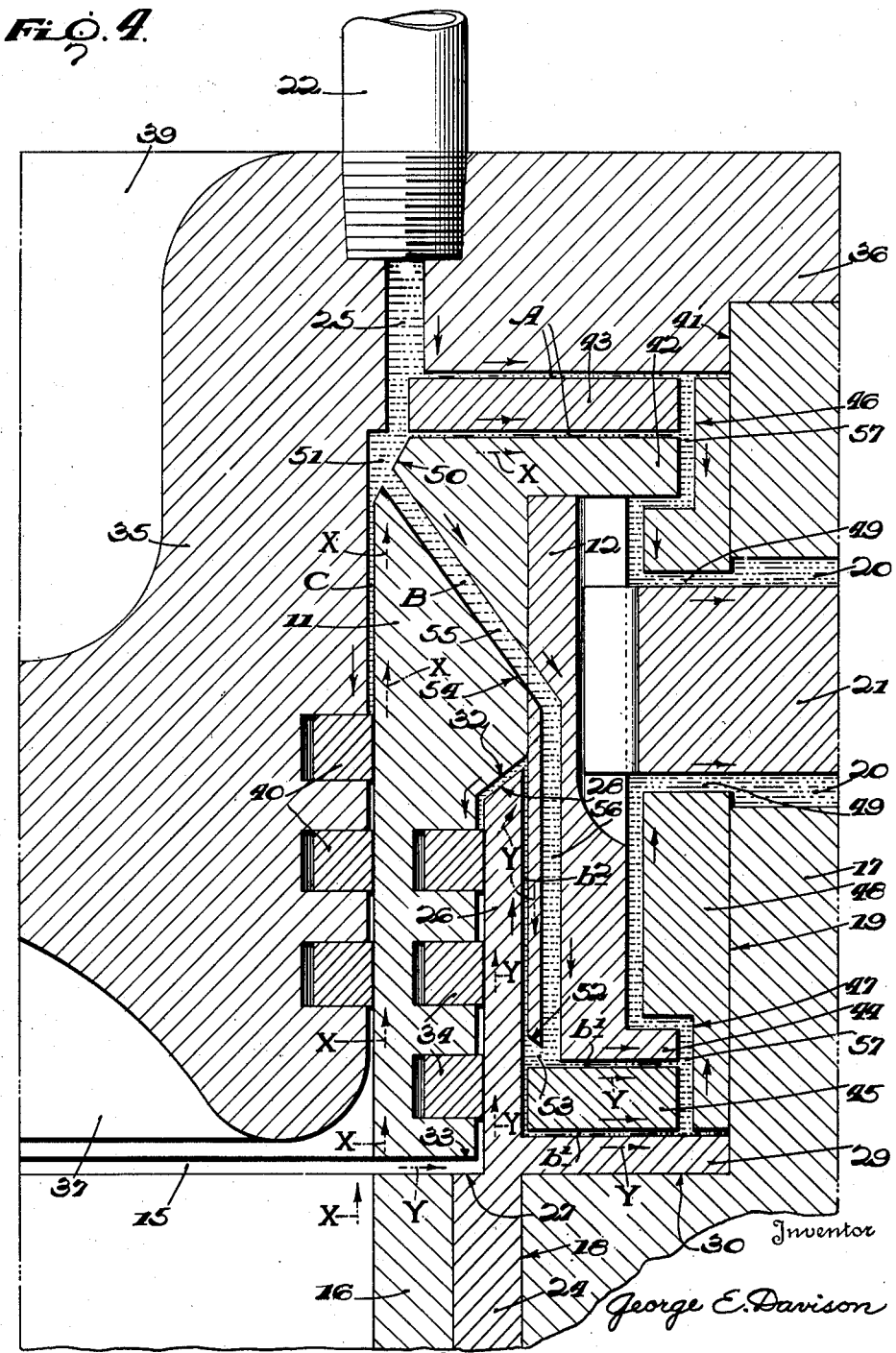

Feb. 17, 1942.   G. E. DAVISON   2,273,179
ROTARY VALVE AND LUBRICATION THEREOF
Filed Aug. 30, 1940   3 Sheets-Sheet 3
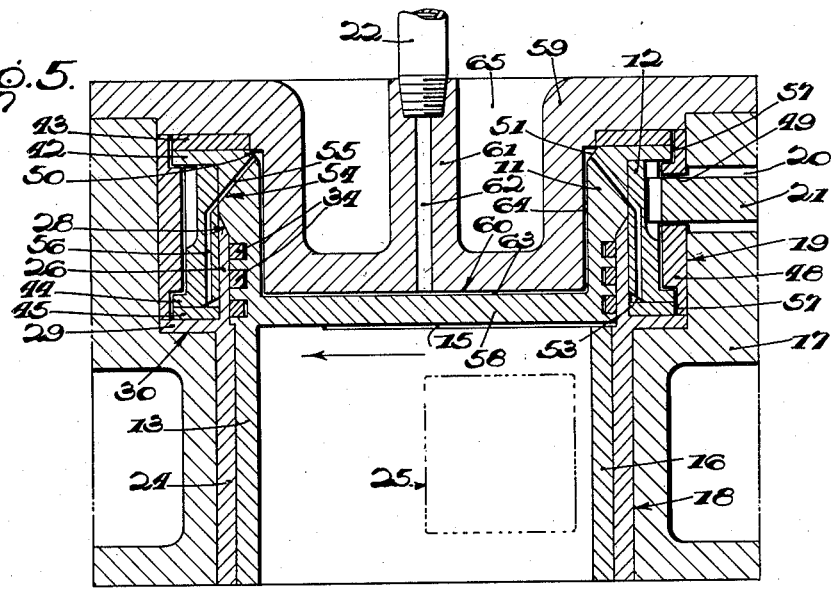
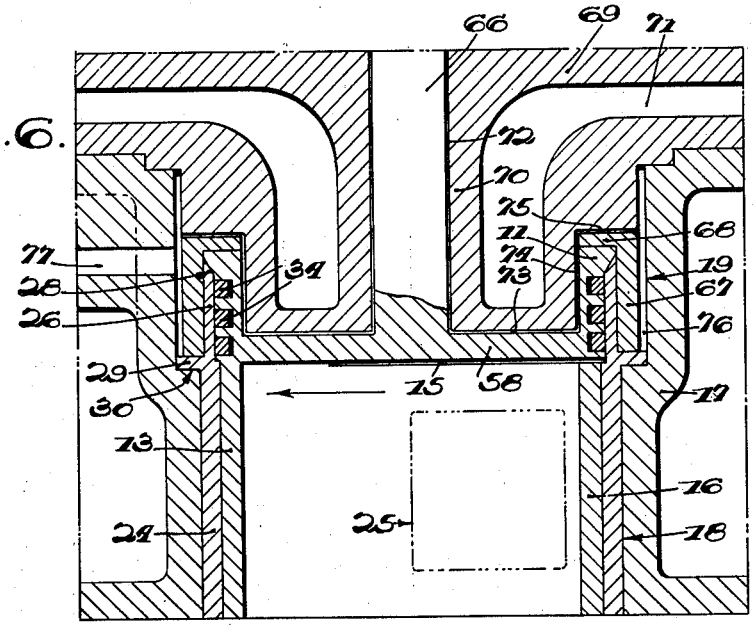
Inventor
George E. Davison
By Cameron, Kerkam + Sutton
Attorneys Patented Feb. 17, 1942

2,273,179

UNITED STATES PATENT OFFICE 2,273,179

ROTARY VALVE AND LUBRICATION THEREOF

George E. Davison, Washington, D. C., assignor to Davison-Douglas Corporation, New York, N. Y., a corporation of Delaware Application August 30, 1940, Serial No. 354,894

33 Claims. (Cl. 123—80)

This invention relates to internal combustion engines of the rotary valve type, and more particularly to improvements in the valve structures of such engines and in the methods and means by which such valves and their driving means are lubricated and sealed against compression losses occasioned by leakage of gases through the clearances between the rotating and non-rotating elements of the valve.

The subject matter of the present invention may also be characterized as an improvement upon the rotary valve structures shown and described in U. S. Patents Nos. 1,684,434 and 1,684,435, granted September 18, 1928, to Dorsett A. Davison, and in U. S. Patents Nos. 1,812,323, granted June 30, 1931, and 1,859,199, granted May 17, 1932, on joint applications of Dorsett A. Davison and George E. Davison.

A rotary valve of the type with which this invention is concerned consists generally of a hollow cylindrical member having relatively thin walls adapted to revolve with a working fit in a fixed casing structure wherein are formed the inlet and exhaust passages and ports for the engine cylinder, the valve itself being provided with a single port in its circumferential wall adapted to be brought during each revolution successively into registry with the fixed ports of the casing structure. As is disclosed in the above mentioned Davison patents, the cylindrical wall of the valve is cut through along both axially and circumferentially extending lines so as to form both a valve port and an arcuate skirt or flap of which the free or trailing edge defines the leading edge of said port, the valve thus comprising a rigid portion and a flap or radially flexible portion attached to the rigid portion at its leading end only so that, as the valve rotates, the flap portion is free to be forced radially outward by its own resiliency assisted by the internal gas pressure.

A rotary valve of this type is particularly advantageous in that it can expand freely without binding in its port-forming casing, the flap being loosely drawn by its foremost or leading end across the ports in the casing, much as a rug can be dragged over an opening in a floor. The flap is thus free to respond to the variations in pressure of the gases in the cylinder so as to increase the tightness of its closure of the casing ports during the compression and power strokes of the piston, while during the intake and exhaust strokes the reduced pressures enable formation and spreading of a film of lubricant over the running surfaces of the valve which is effective to reduce friction throughout the operating cycle.

This construction also enables effective cooling of the valve during each intake stroke and the first part of each compression stroke by the relatively cool air and hydrocarbon spray or vapor of the incoming charge, while the periods of relatively wide port opening not only admit large volumes of fuel charge, but also allow rapid exhaustion of burnt gases with a consequent reduction in their back pressure and heating action on the engine parts.

In spite of these advantages, prior valves of the type described have not been entirely satisfactory because, while the skirt or flap has effectively prevented the escape of gases under compression through the inlet and exhaust ports and passages, there has been considerable leakage of such gases around the hollow cylindrical member or sleeve that carries and operates the valve and thence to the atmosphere through the outlet in the casing structure which must necessarily be provided for discharge of the liquid lubricant used for lubrication of the rapidly rotating valve elements. Such lubricant is customarily supplied through suitable conduits under pressure from a reservoir (usually the engine crankcase) to which it is ultimately returned through the outlet in the valve casing. Inasmuch as the pressure in the lubricant reservoir is substantially atmospheric, any leakage of compressed gases along the rotating surfaces of the valve results in a compression loss by escape of the gases to the atmosphere.

It is therefore one of the primary objects of the present invention to provide a novel method and means for effectively sealing a rotary valve against compression losses, while at the same time insuring adequate lubrication for all parts of the valve and its casing structure, or other bearing surfaces, which are subject to wear.

The problem of proper lubrication of any rotary valve necessarily involves the antithetic difficulties of valve binding, on the one hand, and excessive wear, on the other, the first involving the attendant possibility of breakage of the parts, while the other results in gas leakage causing high compression losses. That is, if the valve and casing surfaces fit so tightly, due to overheating or any other cause, that no oil film can be formed between them, binding and breakage may occur, whereas if they are too widely separated, the oil supplied thereto will be blown through and out during the periods of high cylinder pressure, or drawn into the combustion chamber during the intake stroke, especially when the engine is idling. If, however, films of oil can be maintained continuously between the wearing surfaces of the journal portion of the valve and of its casing or other bearing, they will not only save such surfaces from destructive friction, but will also form hydraulic seals preventing escape of the gases under pressure.

Accordingly, another object of the present invention is to provide an improved rotary valve apparatus for internal combustion engines embodying novel means for conducting lubricant to the opposing surfaces of the rotating valve and its casing structure, and for returning the lubricant from the valve to the source of lubricant supply, which means are so constructed and arranged that any gas attempting to escape from the combustion chamber through the valve apparatus and lubricant outlet will be obstructed by a body of lubricant which is formed and maintained as a hydraulic seal with the assistance of the centrifugal forces generated by rotation of the valve.

A further object is to provide a rotary valve structure which is characterized by the comparative simplicity of its mechanical construction, manner of assembly and principle of operation, and which, by a combination of hydraulic and mechanical sealing means, is capable of successfully solving the problem of sealing the combustion chamber against compression losses and "blow-by," a result which has failed of attainment by the devices heretofore employed.

Inasmuch as considerable difficulty is encountered in constantly maintaining films of liquid lubricant on the wearing surfaces of a hollow cylindrical valve when it is rotating at several thousand revolutions per minute, because of the centrifugal tendency of the lubricant to flow rapidly to the exterior of the valve and to then fly off through the lubricant outlet of the valve casing, the present invention is further characterized by delivery of the lubricant initially to the interior of the hollow valve member and by provision of the latter with passages through which the lubricant may travel to the exterior surfaces thereof under the action of centrifugal force, escape of the lubricant to the outlet being baffled so as to facilitate the formation and maintenance of hydraulic seals in the clearance spaces between the rotating and non-rotating elements of the valve structure, whereby escape of gases from the cylinder and combustion chamber is obstructed.

These and other objects, including the provision of a novel form of rotary valve which permits of full force feed lubrication without danger of flooding the cylinders when the engine is idling, will appear more fully upon consideration of the detailed description of the embodiments of the invention which follows. Although several specifically different constructions embodying the inventive concept are described hereinafter and illustrated in the accompanying drawings, it is to be expressly understood that these drawings are intended for purposes of illustration only and are not to be construed as defining the scope of the invention, reference being had for this latter purpose to the appended claims.

In the drawings, wherein like reference characters indicate like parts through the several views:

Fig. 1 is an axial sectional view of one form of rotary valve apparatus embodying the present invention;

Fig. 2 is a fragmentary, sectioned perspective view showing in partially disassembled relationship certain of the parts of the structure of Fig. 1;

Fig. 3 is a perspective view showing a slight modification of the valve structure illustrated in Fig. 1, some of the parts being broken away and others shown in section, and with the lubricant supply conduit located diametrically opposite the position occupied by it in Fig. 1, in the interest of clarity;

Fig. 4 is an axial sectional view of one side of the structure shown in Fig. 1, but on a greatly enlarged scale so as to indicate the paths of lubricant flow, and the paths along which the gases attempt to escape from the engine cylinder to the atmosphere, through the clearances between the rotating and non-rotating elements of the valve structure, and, as in the case of Fig. 3, with the lubricant supply conduit positioned diametrically opposite its location in Fig. 1; and Figs. 5 and 6 are axial section views, similar in character to Fig. 1, of two additional embodiments of the invention.

Although the valves and associated casings of the accompanying drawings are shown as they would appear when associated with the upper ends of vertical cylinders, it is to be expressly understood that the invention is equally applicable to engines wherein the cylinders occupy other positions than vertical, as in the cases of radial and horizontal engines. Consequently, in describing the relative locations of the various parts in the following disclosure, they will be designated as "inner" and "outer" with reference to their positions relative to the cylinder with which they are associated or to the location of the crankshaft of the engine.

Referring now to the preferred construction illustrated in Figs. 1 and 2, it will be seen that each of the rotary valves of the present invention comprises an outer, hollow operating member consisting of a sleeve-like part 11 and a driving ring gear 12 which is fixed, as by a forced or pressed fit or by being keyed or pinned, to the exterior of the part 11, and an inner hollow skirt 13 preferably formed integrally with the operating member. A portion of the skirt 13 is cut away (as indicated at 14 in Fig. 3) in order to form a port through which the charge and exhaust gases may pass to and from the interior of the valve and the engine cylinder 10 with which the valve is associated, while still another section thereof is separated from the rigid parts of the valve by a circumferentially extending kerf or slot 15 so as to form a valve flap 16 of the character disclosed in the previously mentioned Davison patents. The flap 16 is thus connected to the rest of the valve only at its leading edge (the direction of rotation of the valve being counterclockwise as viewed from above in the drawings and as indicated by the arrows), its trailing edge defining the leading edge of the port formed by the cutaway section 14. With this construction, the valve flap 16 is free to be urged radially outward by its own resiliency and the pressure of the gases within the skirt 13 and the engine cylinder 10 so as to insure tight sealing of the intake and exhaust ports in the casing at the desired intervals as the valve rotates.

In the embodiment illustrated, the valve is housed in a casing 17 which may be in the form of a cylinder head casting adapted to be secured to the cylinder block of the engine in any suitable manner, and which has a cylindrical bore 18 in direct open communication with the combustion chamber of the associated engine cylinder 10. The outer end of the bore 18 is enlarged in diameter as indicated at 19, and is adapted to receive the part 11 and ring gear 12 of the valve operating member and other elements hereinafter described. The valve casing 17 is also provided with a suitable chamber 20, communicating with the enlarged bore 19, in which is mounted a gear 21 having driving engagement with the valve ring gear 12, the gear 21 being so positioned in the chamber 20 as to leave spaces on both sides of the gear which serve as outlets for the lubricant originally supplied to the valve through a conduit 22 and a passageway 23 formed in a member of the casing structure later to be described. Lubricant may be supplied to the conduit 22 under pressure from, and returned from the chamber 20 to, a suitable source, such as the engine crankcase, by any desired type of lubricant circulating system, as, for example, that disclosed and claimed in the application of George E. Davison filed September 16, 1938, Serial No. 230,324, of which this is a continuation in part.

While the illustrated form of spur gear drive for the valve is particularly well adapted for use in aircraft engines having radially disposed cylinders, it will be understood that the valve may be driven by any other suitable means so long as it is properly designed to rotate the valve at the desired speed relatively to that of the engine crankshaft.

Fixed in the bore 18 of the valve casing 17 is a cylindrical port casing 24 in which are formed a charge inlet port 25 (indicated in broken lines in Fig. 1) and a corresponding exhaust gas outlet port (not shown), these ports being properly positioned so as to be alternately opened and closed by the valve port formed by the cutaway portion 14 of the skirt 13 as the valve is rotated. The outer end portion 26 of port casing 24, which lies beyond the transverse plane occupied by the kerf 15 of the valve skirt 13 when the apparatus is assembled, is of reduced wall thickness so as to form an internal shoulder 27, while its outer edge is internally beveled as indicated at 28, for purposes hereinafter to be described.

The port casing 24 is also provided with a radially outwardly extending flange 29 which, in the embodiment illustrated, has its lower or inner surface substantially coplanar with the shoulder 27, this flange being adapted to engage the internal shoulder 30 of the valve casing 17 (formed by the junction of the bores 18 and 19) so as to limit the inward movement of the port casing 24 relatively to the valve casing 17, and thereby insure proper registration of the inlet and exhaust ports of the port casing with the corresponding passageways which are conventionally provided in the cylinder head or valve casing 17.

Although the inner portion of port casing 24 may be dispensed with, if desired, by forming the inlet and exhaust ports directly in the casing 17, its use is of substantial practical advantage in that, should its radially internal surface become scored or otherwise damaged, it can be readily removed and replaced, whereas if the valve flap rotated in direct contact with the wall of the casing 17, scoring and other defects of similar character would be relatively difficult to remedy. In the event that the inner part of port casing 24 is omitted, the outer beveled portion 26 and flange 29 are formed as a separate element adapted to be received in the bore 19 with an accurately machined and centered fit and to rest on shoulder 30, and the radius of the bore 18 is reduced by an amount equal to the wall thickness of the omitted portion of the port casing, thereby making the shoulder 27 a continuation of shoulder 30.

As is clearly shown in Fig. 1, when the valve structure is completely assembled, the outer portion 26 of the port casing 24 extends into an annular space 31 (see Fig. 2) which is formed between the internal surface of the inner portion of the valve ring gear 12 and the external surface of the inner portion of the part 11 of the hollow operating member, said inner portion of the part 11 being of less wall thickness than the outer portion thereof, and the external surfaces of the two portions of different wall thickness being joined by a bevel 32 of the same angularity as the internal bevel 28 at the outer end of the port casing 24. The wall thickness of the valve is again reduced at the transverse plane of the kerf 15 so as to form an external shoulder 33 which cooperates with the internal shoulder 27 of the port casing 24 in helping to baffle any attempted outflow of compression gases at this point of the valve assembly. The greater thickness of the wall of the part 11 of the operating member beyond the plane of kerf 15 facilitates housing of the spring packing rings 34 which rotate with the valve in contact with the internal surface of the outer portion 26 of port casing 24, and assist in sealing the clearance between the valve and port casing against the escape of gases.

Inasmuch as the space within the skirt 13 of the valve is in constant communication with the engine cylinder 10, suitable means must be provided for closing the outer end of the valve and the outer end of the enlarged bore 19 of the valve casing 17. In the embodiment illustrated, this closure is in the form of a dished or cup-shaped plug member 35 which fits into the bore of the part 11 of the hollow operating member of the valve, and is provided with a flange 36 adapted to be bolted or otherwise secured to the valve casing 17. The central portion of the plug member 35 may be provided with a spherically recessed inner surface, as indicated at 37, and adapted to receive a spark plug 38 for igniting the fuel charge within the valve and associated cylinder. The space 39 around the spark plug 38 serves as a chamber for a cooling medium, such as air.

The plug member 35 also constitutes a bearing for the radially internal surface of the part 11 of the valve, for which purpose the radially external surface of said plug member is provided with a plurality of suitable packing rings 40. The packing rings 40 assist in preventing compression losses and "blow-by" through the clearance between the interior surface of the rotating valve and the exterior surface of the plug member. Accurate centering of the plug member 35 in the enlarged bore 19 of the valve casing 17 is ensured by counter-boring the flange 36 as indicated at 41.

The passageway 23 through which lubricant is supplied to the valve mechanism is also located in plug member 35, the inner or delivery end of said passageway being closely adjacent the junction of the flange 36 and the body of the plug member, while its outer end is suitably formed to receive the delivery end of lubricant conduit 22.

The part 11 of the hollow operating member of the valve is provided at its outer end with a radially outwardly extending flange 42, the outer surface of which forms a bearing surface cooperating with a thrust ring 43 interposed between the outer end of the valve and the flange 36 of the plug member 35, while its inner surface constitutes an abutment for the outer end of the ring gear 12. The inner end of the ring gear has a corresponding flange 44 adapted to bear against a second thrust ring 45 which rests on the flange 29 of the port casing 24. The peripherally outer portions of flanges 42 and 44 and thrust rings 43 and 45 extend into grooves 46 and 47 counterbored in the outer and inner edges, respectively, of an annular gear casing 48 which is fixed in the enlarged bore 19 of valve casing 17 and is provided with an opening or window 49 through which extends the peripheral portion of the valve driving gear 21 engaging the ring gear 12. The window 49 also serves as the discharge outlet through which lubricant may flow from the interior of gear casing 48 to chamber 20, and thence back to the engine crankcase or other source of supply.

In the embodiment illustrated in Figs. 1 and 2, the valve casing 17, the port casing 24, the gear casing 48 and the plug member 35 with its flange 36 constitute the casing structure enclosing the rotatable valve. The plug member 35 also functions as the main bearing in the form of a stub journal on which the hollow operating member of the valve rotates, the thrust rings 43 and 45, which have a neat running fit between the flanges 42 and 44 and the adjacent portions of the casing structure, serving to hold the valve in proper axial position on the plug member.

In order to provide for adequate distribution of the lubricant to those parts of the valve structure requiring lubrication, and to enable the formation of bodies of said lubricant into hydraulic seals for the purpose of preventing compression losses and "blow-by" during operation of the engine, novel means are provided for conducting the lubricant supplied through the conduit 22 and passageway 23 to various portions of the valve structure and then to the lubricant outlet provided by gear window 49 in gear casing 48 and the spaces in chamber 20 on either side of driving gear 21.

As shown, the radially internal, outer edge of the part 11 of the valve is beveled, as indicated at 50, so as to form an annular groove or chamber 51 of triangular cross section when the valve structure is assembled as shown in Fig. 1, while a like bevel 52 at the radially internal, inner edge of ring gear 12 forms a similar annular groove or chamber 53. These two chambers are interconnected by a plurality of passages 54 cored or bored in the part 11 and in the ring gear 12. Preferably, each of the passages 54 comprises a section 55 which is inclined to the axis of the valve and leads away from the chamber 51, and a second section 56 which extends parallel to the valve axis and discharges into the chamber 53. Although there are four such passages 54 in the construction illustrated in Figs. 1 and 2, it will be understood that any suitable number may be provided.

There are, of course, working clearances provided on both sides of the thrust rings 43 and 45 through which lubricant may work radially outwardly under its initial pressure aided by that produced by centrifugal action resulting from the rapid rotation of the flanges 42 and 44, as well as from any slower revolution of the rings themselves induced by their contact with said flanges. Much wider clearances 57 are provided between the peripheral edge portions of the flanges 42 and 44 and rings 43 and 45, and the axially extending surfaces of the counterbored grooves 46 and 47 of the gear casing 48. The lubricant-holding spaces formed by the last mentioned clearances connect with the main portion of the interior of the gear casing 48 lying between them in which the ring gear 12 rotates. Since the lubricant supply passageway 23 discharges into the valve interior, while the lubricant outlet formed by the window 49 and chamber 20 lies opposite the peripheral surface of the hollow operating member of the valve, it is obvious that to reach said outlet the lubricant must pass over one or the other of the flanged ends of said operating member.

The novel valve structure thus described provides pockets or spaces into which lubricant will be driven and in which it will be retained by centrifugal action in spite of the pressure of gases attempting to leak out from the combustion chamber of the engine cylinder, the pocketed pools of lubricant not only helping to effect lubrication, but also serving at high engine speeds to seal the hollow operating member of the valve against escape of gases past that member.

For lubrication purposes, lubricant must be constantly supplied to the working clearance spaces between the plug member 35 and the radially internal surface of the valve part 11, to all surfaces of the thrust bearing rings 43 and 45, to the peripheries of the flanges 42 and 44 of the part 11 and ring gear 12, respectively, and to the beveled edge 28 of the port casing 24, as well as to both surfaces of the outer portion 26 of said port casing which lies between the part 11 and the ring gear 12.

The lubricant supplied through the passageway 23 follows branching paths which may be traced as follows:

The passageway 23 delivers lubricant under the proper pressure to one edge of the outer face of the thrust ring 43, to its radially internal surface, and to the annular chamber 51 which is formed by the bevel 50 of the outer, radially internal edge of the valve part 11. From the interior of the ring 43 some lubricant is driven by centrifugal action radially outward and around it to the adjacent annular clearance space 57 surrounding said ring. From the annular chamber 51, serving as a distributing reservoir, a second and larger portion of the lubricant enters passages 54 and through them reaches the annular chamber 53, serving as a sub-distributing reservoir, and the outer surface of the bearing ring 45. A third, and preferably the smallest, portion of the lubricant is forced between the part 11 and the plug member 35 and ultimately reaches the spring packing rings 40. Under proper conditions, however, only a moderate quantity of lubricant reaches these rings, and none should pass by them into the combustion space of the engine. From the sub-distributing reservoir or chamber 53, lubricant flows around thrust ring 45 to the portion of the clearance space 57 surrounding the radially external periphery of said ring, as well as along another sub-branch between the radially external surface of the port casing 24 and the opposing radially internal surface of ring gear 12, and around the beveled edge 28 of said casing to the packing rings 34.

As far as the formation and maintenance of hydraulic seals are concerned, it may be pointed out that gas tends to escape along two paths, one between the plug member 35 and radially internal surface of the valve part 11, around the latter's flange 42 and bearing ring 43, and thence through the adjacent portion of the interior of the gear casing 48 to the gear window 49, and the other between the radially external surface of the part 11 and the radially internal surface of the port casing 24, around the beveled edge 28 of the latter, between the radially external surface of the port casing and the radially internal surface of the ring gear 12, past the thrust ring 45, and then through the adjacent portion of the interior of the gear casing 48 to the common exit window 49. The construction shown in Figs. 1 and 2 seals up both of the above traced gas paths by establishing permanent pools of lubricant in the annular spaces formed by the counterbored grooves 46 and 47 of the gear casing 48 in cooperation with the flange 36 of the plug member 35 and the flange 29 of the port casing 24, as diagrammatically indicated in Fig. 4. Lubricant is flung into and retained in these annular recesses by centrifugal action. It enters them by being thrown off centrifugally from the rapidly rotating flanges 42 and 44 of the hollow operating member of the valve formed by the part 11 and ring gear 12 which is fast thereon. It is kept in rotary motion around these annular channels by surface friction of the rapidly revolving flanges, and is consequently held therein by centrifugal action whether the valve axis be vertical, horizontal or inclined. It can escape from either of these pockets only when enough has accumulated therein to overflow into the space in which the gears are revolving, and thence out through the window 49.

The paths followed by the lubricant supplied to the valve, and those along which the gases seek to escape past the part 11, are diagrammatically shown in Fig. 4, wherein channels filled with lubricant are indicated by horizontal cross hatching and solid line arrows are used to show the directions of flow of lubricant, and wherein the directions of attempted flow of compression gases are indicated by broken line arrows.

The stream of lubricant supplied by the passageway 23 is divided into the three branches above described, marked A, B and C in Fig. 4, the branch B which discharges into the sub-distributing reservoir 53 also having sub-branches extending therefrom marked $b^1$ and $b^2$.

Lubricant in branch A ultimately seeps through the centrifugally maintained liquid seal in the clearance space 57 around the flange 42 of the part 11, and overflows therefrom to the outlet window 49. Lubricant in sub-branch $b^1$ similarly seeps through the liquid seal around ring gear flange 44 to the same exit, while that in sub-branch $b^2$ works slowly around the beveled edge 28 of the port casing 24 to the packing rings 34. Lubricant in branch C is intended to flow no further than packing rings 40.

Gases under compression seek to escape around the hollow operating member of the valve by the two paths marked X and Y in Fig. 4.

The first path X extends along the radially internal surface of the part 11, past packing rings 40, through branch C to the annular channel or main distributing reservoir 51, and thence through the lubricant in branches A and B. There can be no escape of gas through lubricant passageway 23 and conduit 22 because any such backflow therethrough is blocked by the valves of the lubricant pump. Any gas working through branch A is stopped by the centrifugal liquid seal in which the flange 42 is immersed, while any which reaches sub-branch $b^1$ is similarly blocked by the lubricant seal centrifugally packed around ring gear flange 44. If any gas tries to escape by pushing out through the oil in sub-branch $b^2$, it is blocked by packing rings 34, and when it tries to pass these it is met by a current of gas of equal or greater pressure attempting to escape by the second path Y. It is therefore obvious that the escape of gas along the path X will be effectively obstructed.

The second path Y extends along the radially external surface of the part 11, past the packing rings 34 into sub-branch $b^2$, and then through the lubricant therein to the sub-distributing reservoir 53. From the latter it would most naturally flow with the lubricant in sub-branch $b^1$ to the seal around ring gear flange 44. Any gas attempting to back up through passages 54 would encounter lubricant flowing in the opposite direction, as well as gas that might have branched off from the path X as above suggested, the result being that any such backflow of gas through the passages 54 would be effectively obstructed. Streams of gas trying to enter the passages 54 from both ends would counteract each other. It is equally obvious, therefore, that the escape of gas by path Y will be effectively obstructed.

By way of summary of what has been stated with reference to Fig. 4, it may be pointed out that there is ensured (1) a constant, even distribution of lubricant over all wearing surfaces which can be accurately metered by the rate of delivery from the lubricant pump, and (2) a retention by the terminal hydraulic seals in the clearance spaces 57 of enough lubricant to keep all spaces between wearing surfaces filled with films of lubricant which will necessarily also serve as liquid seals against the escape of compression gases, while (3) currents of gas seeking to escape along either radially internal or external surfaces of the part 11 and ring gear 12 are met and blocked by currents of lubricant flowing in directions opposite to those in which the gases are attempting to flow through the same passages.

The action of centrifugal force on lubricant in the annular clearance spaces 57 and on any gas bubbles mixed with the lubricant is like that of an ordinary centrifuge, any such lighter gas bubbles being forced back toward the axis of the valve, while the heavier lubricant is packed outwardly into the annular spaces and driven rapidly around the circular path formed thereby. Although the construction shown in Figs. 1, 2 and 4 differs from that of an ordinary centrifuge wherein the container for the liquid revolves, the action will be the same in principle, even though somewhat less effective because the friction of the stationary walls of the casing structure slows down the lubricant thrown against them by the flanges 42 and 44.

If the radius of each of these circular paths is two inches and the valve is making 1,000 revolutions per minute, the centrifugal force exerted on a particle of lubricant thrown off by the rim of either of flanges 42 and 44 would be approximately fifty times the pull of gravity thereon, so that said particle would always be held tightly against the annular wall as it is driven around by the flange, whether the valve axis be vertical, horizontal or inclined. Inasmuch as valves in four cycle engines rotate at one-half the crankshaft revolutions per minute, if the engine of the present invention were running at 3,000 revolutions, the valve would run at 1,500; and since centrifugal force varies as the square of the peripheral velocity, the force exerted on each particle of lubricant carried around on the flanges 42 and 44 would then be more than one hundred times the weight thereof.

A particularly advantageous feature of the construction illustrated in Figs. 1, 2 and 4 is the location of the annular chamber or sub-distributing reservoir 53 at a greater radial distance from the axis of the rotating valve than that at which the annular main distributing reservoir 51 is located, so that centrifugal action will also aid the pump pressure in forcing lubricant from the latter chamber to the former through the interconnecting passages 54, of which at least portions are directed away from said axis. As shown, the inlet sections 55 of these passages can readily be given a considerable inclination because they are located in the thicker portion 11 of the hollow operating member, while the outlet sections 56 which discharge into sub-reservoir 53 have to extend substantially parallel to the axis because they are located in the relatively thinner wall of the ring gear 12. This location of the inclined sections of the lubricant distributing passages at their inlet ends is additionally advantageous since it ensures the existence of centrifugal pressure on all of their contents, and the consequent maintenance therein of a considerable volume of lubricant always ready for discharge into the adjacent annular reservoir 53 under such centrifugal pressure, and the retention thereof in that reservoir.

Centrifugal action on the lubricant in the inlet sections 55 of the passages 54 also creates a hydraulic pressure on the lubricant in sub-distributing reservoir 53, with the result that the path Y for escaping gas is doubly sealed centrifugally by the continual forcing of such lubricant against the baffle surfaces of the thrust ring 45 and the port casing 24.

The various elements of the valve structure above described are adapted not only for efficient cooperation when assembled, but also for convenience in assembly and installation in working position, the preferred method of assembly being substantially as follows:

After first mounting the packing rings 34 in the grooves formed in the exterior surface of valve part 11 and placing the gear casing 48 around ring gear 12, the latter element is driven onto, or otherwise fixed to, the part 11 so as to confine the gear casing between the flanges 42 and 44 of the part 11 and ring gear 12, respectively. Port casing 24 is then inserted in bore 18 of the cylinder head or valve casing 17 and forced inwardly until its flange 29 is properly seated on shoulder 30, whereupon thrust ring 45 may be slipped over portion 26 of the port casing and dropped down onto flange 29. The assembled valve unit, including the ring gear 12 and gear casing 48, is next inserted into the enlarged bore 19 of the valve casing 17 with the valve skirt 13 entering into the outer end portion 26 of port casing 24. As the unit is then forced inwardly, the bevel 28 at the outer end of the port casing 24 comes into contact with the packing rings 34 one after another and cams or compresses them into their respective grooves in the part 11. The packing rings 34 are thus successively compressed by the action of the beveled surface 28 while the valve unit moves inwardly until the inner flanged end of ring gear 12 comes into engagement with the thrust ring 45. The valve is then rotated manually until the flap 16 occupies the proper position relative to the ports of the port casing 24 corresponding to the position of the engine crankshaft (unless the valve is initially inserted in such position with the aid of timing marks), whereupon the driving gear 21 is brought into mesh with ring gear 12 and operatively connected to the crankshaft.

The packing rings 40 are next placed in the grooves of plug member 35, and the latter is inserted into the bore of the valve part 11. As the plug member is moved inwardly, the beveled surface 50 of part 11 engages and automatically compresses the packing rings 40 one after another in the same manner as that described above in connection with the bevel 28 and packing rings 34. This action on the rings 34 is, however, much more important than in the case of rings 40, because the former are inaccessible to tools or fingers after they have entered the mouth of the bore 19.

When the parts have been thus assembled in the relationship indicated in Fig. 1, the flange 36 of plug member 35 may be bolted or otherwise secured to the valve casing 17 in any suitable manner.

While the foregoing method of assembly is that which is at present preferred, it will be obvious that the procedure may be modified, if desired. For example, if the annular space 31 provided between the radially external surface of the part 11 and the radially internal surface of ring gear 12 is of sufficient width, the packing rings 34 need not be placed in their respective grooves until after the ring gear 12 has been assembled with the part 11. However, these and like modifications of the method of assembly in no way affect the operation of the beveled surfaces 28 and 50 in compressing the packing rings.

In a valve assembly of this construction, it will be noted that the part 11 practically floats between the two sets of elastic packing rings 34 and 40, so that it need never bind on its bearings. Furthermore, such freedom from binding is additionally assured by reason of the fact that the plug member 35 on which the part 11 is journaled is always water or air cooled (although neither jacket nor fins have been shown in the drawings for simplicity's sake) and thus forms an internally cooled bearing, the result of which is that both the valve part 11 and the port casing 24 (neither of which is artificially cooled) would move away from, rather than bind on, the plug member should there be any difference in expansion.

Another advantage of the disclosed construction resides in the "hairpin" outline or form of the path which the gases must follow in trying to escape around the outer beveled edge 28 of the port casing 24 (as indicated at Y in Fig. 4), any such sharp reversal of direction tending to retard gas flow.

If, in engines having vertically disposed cylinders, the outer beveled edge 28 of the port casing 24 is positioned above the normal level of the oil which collects inside the gear casing 48— that is, above the plane of the lower edge of gear window 49—as is the case in the embodiment illustrated in Fig. 1, the structure possesses the still further advantage of preventing any seeping of oil down into the engine cylinder from the gear casing when the engine is at rest. In such engines, the body of oil which fills the portion of space 57 lying below the lower edge of outlet 49 forms a particularly effective, ever present liquid seal against compression losses.

The valve structure illustrated in Fig. 3 is identical with that of Figs. 1, 2 and 4 except that the ring gear 12 has no exterior flange corresponding to flange 44, and the flange 42 on the valve part 11 does not project beyond the external periphery of the ring gear as is the case in Figs. 1, 2 and 4. With the construction of Fig. 3, the valve assembly can be (and is shown as) mounted directly in the bore 19 of the cylinder head valve casing 17 without the provision of any surrounding gear casing like that indicated at 48 in the embodiment previously described.

While the structure of Fig. 3 does not produce in operation a hydraulic sealing action as complete as that resulting from the immersion of the flanges 42 and 44 in the annular bodies of lubricant centrifugally maintained in the clearance spaces 57 of the embodiment illustrated in Figs. 1, 2 and 4, it nevertheless prevents the escape of compressed gases to an extent sufficient for efficient operation of the engine in most cases. The flow of lubricant through the sections 55 and 56 of passages 54 is effectually baffled by the thrust bearing ring 45 located at the delivery ends of said passages, and a considerable portion of such lubricant is forced back between the radially internal surface of the ring gear 12 and the adjacent radially external surface of the port casing 24, and around the beveled edge 28 of the latter to the packing rings 34. Consequently, any possible passage of gas by way of the radially external surface of the part 11 is effectually sealed off by the films of lubricant so maintained, as well as by the body of oil which collects in the space 57 inwardly of the outlet into chamber 29. At the same time, adequate sealing films of lubricant are maintained at the sides of the outer thrust ring 43, and around its periphery and that of the flange 42, by direct supply from the lubricant inlet passageway 23. Consequently, any gas attempting to escape by way of the radially internal surface of the part 11 must not only get by the packing rings 40 and through the film of lubricant between the radially external surface of the plug member 35 and the radially internal surface of the part 11, but must also penetrate the sealing films around the ring 43—which is usually sufficient to prevent any outflow along that path.

In Fig. 5 there is disclosed another modified form of valve structure embodying the invention which differs from that of Figs. 1, 2 and 4 primarily in that the valve is provided with a solid, transversely extending wall or web 58 located just above the plane of the kerf 15, so as to completely seal off the interior of the valve within the skirt 13 from that portion lying within the part 11 of the operating member.

The plug member 59 of this modification also differs from that of the previously described embodiments in that (a) it is not provided with any packing rings engaging the radially internal surface of the part 11 of the rotating valve structure, such rings being unnecessary in view of the provision of the transverse wall 58, (b) its inner surface 60 is plane rather than spherically recessed, and (c) in lieu of the spark plug, it is provided with an outwardly extending, centrally located boss 61 in which is cored or bored a lubricant inlet passage 62 to which the lubricant is supplied by the conduit 22. In an engine embodying this form of valve structure, the spark plugs may be located laterally with respect to the combustion chambers of the cylinders, as, for example, in the manner indicated in Figs. 5 and 10 of the previously mentioned Davison application, Serial No. 230,324, of which this is a continuation in part.

The lubricant supplied to the passage 62 under pressure from a suitable pump through the conduit 22 is forced both by the pump pressure and by centrifugal force through the space 63 between the inner surface 60 of plug member 59 and the outer surface of transverse wall 58, and then outwardly through the annular space 64 between the radially external surface of the plug member 59 and the radially internal surface of the part 11 of the operating member of the valve, the relative dimensions of which spaces have been intentionally magnified in the drawing in the interest of clarity. From the annular space 64, the lubricant flows into the chamber or main distributing reservoir 51 formed by the bevel 50 in the outer, radially internal edge of part 11, whence it is distributed to the other parts of the valve structure, and ultimately flows to the exit or discharge window 49 in the gear casing 48, in the same manner as has already been described in connection with the embodiment of Figs. 1, 2 and 4.

The principal advantage of the construction of Fig. 5 is that the provision of the transverse wall or web 58 eliminates all tendency for the escape of gases or "blow-by" around the plug member, a result which also renders unnecessary the use of packing rings between the plug member and the hollow operating member of the valve. Furthermore, it is also permissible with this structure to employ a continuous, full force feed lubrication system without danger of flooding the cylinders when the engine is idling, whereas in the previously disclosed embodiments the lubricant supply must be suitably regulated in order to prevent such flooding during idling operation.

Although the presence of the transverse wall 58 produces an unbalanced outward thrust on the rotatable valve structure caused by the pressure of the gases under compression, this thrust will be adequately taken care of by the relatively large bearing area formed by the inner surface 60 of plug member 59, and by the presence in the clearance spaces 63 and 64 of a continuous body of lubricant under high pressure. If desired, this outward thrust could be completely absorbed by the use of a ball thrust bearing of any suitable construction in lieu of the outer thrust ring 43.

As in the cases of the structures of Figs. 1–4, the plug member 59 of Fig. 5 is adapted for internal cooling by means of the space 65 surrounding the central boss 61, so that there is no tendency to binding or seizure thereon of the surrounding, uncooled part 11 of the valve. In order to assist in cooling of the transverse wall or web 58, the inlet port 25 and its associated passage (not shown) may be so constructed and arranged as to direct the relatively cool incoming charge outwardly against said wall with a cyclonic or whirling motion. A lubricant cooler may also be employed, if desired, to lower the temperature of the lubricant which is delivered into contact with the upper surface of the wall 58 through the passage 62.

The embodiment of Fig. 6 is a modification of the transversely webbed or cupped form of valve shown in Fig. 5, but differs therefrom, and from all of the other embodiments of the invention herein illustrated, in that the valve is not rotated by means of a ring gear fixed on the part 11 and a cooperating driving gear housed in the cylinder head valve casing, but is instead provided with an outwardly extending shaft 66 fixed to, and preferably formed integrally with, the transverse wall or web 58, which shaft is adapted to be driven by any suitable means (not shown).

In lieu of the ring gear of the previously described embodiments, the part 11 of the valve of Fig. 6 is provided with an annular capping ring 67 having a radially inwardly extending flange 68 which overlies the outer end of part 11, the capping ring being fixed to said part in any suitable manner, as by a forced or pressed fit, and forming between its radially internal surface and the radially external surface of part 11 an annular space similar to that shown at 31 in Fig. 2, for reception of the outer end portion 26 of port casing 24.

The plug member 69 which closes the outer end of the enlarged bore 19 of valve casing 17 in Fig. 6 is provided with a central bearing portion 70 for the shaft 66, and with a cored space 71 through which a suitable cooling medium may be circulated. The clearance spaces 72, 73, 74 and 75 between the shaft 66, the outer surface of transverse wall 58, the radially internal surfaces of part 11 and of the capping ring flange 68, and the outer surface of the latter flange, respectively, and the immediately adjacent surfaces of the plug member 69, are so designed that lubricant may be forced therethrough by any suitable means (not shown), and with the aid of centrifugal force, so as to ultimately reach the annular space 76 which lies between the radially external surface of capping ring 67 and the wall of the enlarged bore 19 of valve casing 17. The lubricant which thus reaches space 76 collects and dams up in the inner portion thereof so as to form a hydraulic seal at the zone of contact between the inner edge of capping ring 67 and the flange 29 of port casing 24, and thereby oppose any escape of gases through the lubricant outlet 77 which is in direct communication with the space 76, which gases attempt to flow outwardly through the space between the radially external surface of part 11 and the radially internal surface of the outer end portion 26 of port casing 24, past the packing rings 34, around the outer beveled end 28 of port casing 24, then inwardly through the clearance between the adjacent surfaces of port casing 24 and capping ring 67, and finally out into space 76 through the clearance between the inner edge of said capping ring and the flange 29 of the port casing. The only possible path of escape for compression gases in the structure of Fig. 6 is thus adequately baffled and obstructed by a hydraulic seal of lubricant formed and maintained with the assistance of centrifugal force in generically the same manner as in the previously described embodiments of Figs. 1–5.

As compared with rotary valve structures of the types heretofore known, all of the disclosed embodiments of the present invention possess the important characteristic of creating and maintaining adequate films of lubricant between all of the bearing surfaces of the rotating valve and its enclosing casing structure, and of segregating or separating these films from the intense heat of the gases of the combustion chamber and exhaust outlet so as to avoid their carbonization or vaporization thereby. While the valve itself is directly exposed to the heat of each burning charge and of the outgoing current of exhaust gases, it usually needs little lubrication, and no special provision for such lubrication has been shown. In practice, the use of minute quantities of lubricant sprayed into the stream of ingoing fuel charge by apparatus commonly sold and used for that purpose has usually proven to be sufficient.

There is thus provided by the present invention a novel method, and new and improved means, for lubricating rotary valves and sealing said valves against compression losses and "blow-by," which enable for the first time, as far as is known, successful and practical operation of such valves in high compression engines. Although several different forms of valves have been described and illustrated in the accompanying drawings, it will be obvious that the invention is not limited to the exact structures shown, but is capable of a variety of mechanical embodiments. Various changes, which will now suggest themselves to those skilled in the art, may therefore be made in the form, details of construction and arrangement of the parts without departing from the spirit of the invention, the limits of which are intended to be defined by the appended claims.

What is claimed is:

1. In a rotary valve apparatus for internal combustion engines of the type including a stationary casing structure surrounding the valve and having an oil inlet and an outlet through which oil may flow after lubricating the valve, means for maintaining by operation of centrifugal force a quantity of oil disposed as an annular body in and filling the space between said stationary casing structure and the adjacent portion of said valve in a position such that said oil will seal a path along which gases attempt to flow in escaping from the engine cylinder.

2. A rotary valve apparatus for the cylinder of an internal combustion engine comprising a rotatable valve member for controlling the intake and exhaust of said cylinder, stationary casing structure surrounding said valve member, means for delivering lubricant to the interior of said casing structure, means including passageways formed in said valve member for conducting said lubricant to the portions thereof requiring lubrication, and means for collecting and maintaining a portion of said lubricant in the form of an hydraulic seal at at least one point within said casing structure at which gases attempt to escape from said cylinder about said valve during the compression and power strokes.

3. In a rotary valve apparatus for the cylinder of an internal combustion engine, the combination of a rotary valve and driving means therefor, means for delivering lubricant to said valve to lubricate the same, an annular groove in the inner wall surface of said valve for collecting said lubricant to form an hydraulic seal to insure against compression losses and "blow-by" from said cylinder past said valve, and means for permitting excess lubricant to move from said collecting groove toward the outer peripheral portion of said valve under the action of centrifugal force when said valve is rotated.

4. In a rotary valve apparatus for the cylinder of an internal combustion engine, the combination of a rotary valve and driving means therefor, a source of lubricant supply, means for conducting lubricant from said source to said valve to lubricate the same, means associated with said valve for collecting and maintaining a portion of said lubricant in the form of an hydraulic seal at at least one point on the surface of the valve in the path along which the gases attempt to escape from said cylinder during the compression and power strokes, and means for returning excess lubricant from said collecting means to said source.

5. In a rotary valve apparatus for the cylinder of an internal combustion engine, the combination of a rotary valve and driving means therefor, a source of lubricant supply, means for conducting lubricant from said source to said valve to lubricate the same, and means associated with said valve for collecting and maintaining a portion of said lubricant in the form of an hydraulic seal at at least one point on the surface of the valve in the path along which the gases attempt to escape from said cylinder during the compression stroke.

6. In a rotary valve apparatus for the cylinder of an internal combustion engine, the combination of a rotary valve and driving means therefor, means for delivering lubricant under pressure to the outer end portions of said valve to lubricate the same, an annular groove in the inner wall surface of said valve for collecting said lubricant to form an hydraulic seal adjacent said valve to insure against compression losses and "blow-by" from said cylinder, and means for permitting excess lubricant to move from said collecting groove toward the outer peripheral portion of said valve under the action of centrifugal force when said valve is rotated.

7. In a rotary valve apparatus for the cylinder of an internal combustion engine, the combination of a rotary valve and driving means therefor, a valve plug bearing disposed adjacent the outer end portion of said valve and sealing the outer end of said cylinder, means for delivering lubricant to the outer end portion of said valve to lubricate the same, an annular channel disposed between said valve and said valve plug bearing for collecting said lubricant to form an hydraulic seal to insure against compression losses and "blow-by" from said cylinder between said valve and plug bearing, and means for permitting excess lubricant to move from said channel toward the outer peripheral portion of said valve under the action of centrifugal force when said valve is rotated.

8. In a rotary valve apparatus of the type including a stationary casing structure surrounding the valve, means for maintaining by operation of centrifugal force a quantity of oil disposed as an annular body in and filling the space between said stationary casing structure and the adjacent portion of said valve during rotation of the latter comprising an annular groove in said casing interior and an oil outlet adjacent thereto, a flange on said valve revoluble in and partly filling said groove, and means for depositing oil on the surface of said flange, whereby particles of oil flowing into said groove are caused to travel around it by friction of said flange until a sufficient quantity accumulates to overflow to said outlet, thereby maintaining a bath of oil about the periphery of said flange.

9. In a rotary valve apparatus, the combination of a tubular valve carrying structure, a stationary casing structure enclosing said valve carrying structure and provided with an outlet opposite the periphery of the latter, mechanism for rotating said valve carrying structure, means including an inlet to said casing structure for delivering a supply of oil to the interior surface of said valve carrying structure, and means providing a path of flow for said oil from said interior surface to the other surfaces of said valve carrying structure requiring lubrication, whereby any centrifugal force acting on said oil because of its rotation on the surfaces of said valve carrying structure about the axis thereof will tend to spread the oil over said surfaces and to cause it to flow toward said outlet.

10. In a rotary valve apparatus, the combination of a tubular valve carrying structure, a stationary casing structure enclosing said valve carrying structure and having a pair of axially spaced annular grooves formed in the interior thereof and an outlet located between said grooves opposite the periphery of said valve carrying structure, a pair of flanges formed on said valve carrying structure adapted to revolve one in each of said grooves, means for rotating said valve carrying structure, means including an inlet to said casing structure for delivering a supply of oil to the interior surface of said valve carrying structure, and means for conducting oil from said valve carrying structure interior to each of said grooves, whereby, under the influence of centrifugal force, annular bodies of oil will collect in both said grooves and form oil seals in which said flanges will be continually immersed while said valve carrying structure is rotating.

11. In a rotary valve apparatus for internal combustion engines, the combination, with a tubular valve supporting structure, a plug bearing for the interior of said structure and a stationary casing structure which surrounds the periphery and one end of said valve supporting structure and has an outlet for oil opposite such periphery, of means for injecting oil into the interior of said valve structure, fluid conducting means leading therefrom to points on the outer periphery of said valve structure located on either side of said outlet, and means for utilizing the action of centrifugal force to maintain annular bodies of oil so disposed with respect to said valve and casing structures as to block any attempted flow of gases around or through said valve structure to said outlet.

12. In a rotary valve apparatus, the combination of a revoluble valve having a pair of spaced-apart peripheral flanges, a casing therefor having annular grooves in which said flanges are nested and an outlet located between said grooves, and means for delivering oil to the interior of such valve and for conducting it to both said grooves.

13. A rotary valve apparatus as defined in claim 12 including two loose bearing rings in said casing, one adjacent each valve flange and each having its periphery extending into the casing groove in which such adjacent flange is nested.

14. In a rotary valve apparatus, the combination of a revoluble valve having a tubular portion, a casing structure in which said tubular valve portion is revoluble, means for delivering oil to the interior of said casing at a point near one end of the interior of said tubular valve portion, and a conduit in said tubular valve portion extending from the end of its interior at which oil is delivered to a point on the exterior thereof adjacent its other end which is more distant radially from the valve axis than is the inlet end of such conduit.

15. In a rotary valve apparatus, the combination of a revoluble valve having a tubular portion, a casing structure in which said tubular valve portion is revoluble, means for delivering oil to the interior of said casing at a point near one end of the interior of said tubular valve portion, and a conduit in said tubular valve portion extending from the end of its interior at which oil is delivered to a point on the exterior thereof adjacent its other end which is more distant radially from the valve axis than is the inlet end of such conduit, the inlet section of said conduit being inclined to the valve axis while the outlet portion is substantially parallel thereto.

16. In a rotary valve apparatus, the combination, with a revoluble valve having a tubular portion, of a casing structure therefor having an oil inlet near the end of the interior of said tubular valve portion and a peripheral surface opposite another portion of the valve surface more remote from the valve axis than is said oil inlet, said valve having an oil conduit formed therein extending from a point in its interior near said oil inlet in a substantially direct line to one on said last mentioned surface, whereby, when such valve revolves rapidly, centrifugal action will tend to force oil into any space existing between said opposite valve and casing surfaces.

17. A rotary valve apparatus as defined in claim 16 in which one of said opposing surfaces has a contour such as to form an annular chamber communicating with said conduit in which oil under centrifugal pressure may accumulate.

18. In a rotary valve apparatus for the cylinder of an internal combustion engine, the combination of a revoluble valve having a tubular portion with a deep annular groove formed in one of its end walls, a tubular casing adapted to be set in the cylinder head with its protruding end extending into, and closely fitting in, said groove, and means for preventing the escape of compressed gases through the interior of said tubular valve portion, whereby any such gases attempting to escape to the exterior of such valve portion must flow through a passage of hairpin cross section around the end of said casing which extends into said groove.

19. In a rotary valve apparatus for the cylinder of an internal combustion engine, the combination of a revoluble tubular valve carrying structure, and a casing structure therefor adapted to form the cylinder head and having an oil inlet adjacent the outer end of the valve structure and an oil outlet opposite the periphery thereof, said valve and casing structures being so designed that when oil is forced into the casing through said inlet all currents of compressed gases coming from said cylinder and seeking to reach said oil outlet must flow through common oil and gas passages in directions opposite to those in which the oil is tending to flow.

20. In a rotary valve apparatus, the combination of a tubular valve carrying structure, a casing structure in which said valve carrying structure is mounted having an oil holding space and an outlet therefor so located as to retain a quantity of oil therein when the axis of said valve carrying structure extends vertically to the plane of the horizon, and a tubular bushing fixed in said casing, the upper end of said bushing extending above the level of said outlet so that none of the contents of said oil holding space will flow by gravity down inside of said bushing.

21. A rotary valve mechanism for the cylinder of an internal combustion engine comprising a rotary valve structure including a hollow cylindrical member fixed to the outer end portion thereof and adapted to receive the valve rotating force, a casing structure in which said hollow cylindrical member is housed having an inlet and an outlet for lubricant, and means including passageways formed in said hollow cylindrical member for conducting lubricant from said inlet to the opposing surfaces of said valve and casing structures and thence to said outlet, said passageways being so constructed and arranged that the lubricant flowing therethrough constitutes an hydraulic seal obstructing the path of escape for gases from said cylinder to said outlet.

22. A rotary valve mechanism according to claim 21 wherein the direction of flow of the lubricant through said passageways is opposite to the direction in which the gas attempts to flow in escaping from the cylinder.

23. A rotary valve mechanism according to claim 21 wherein the lubricant is initially delivered by said lubricant conducting means to the interior of the hollow cylindrical member, and the latter includes at least one passageway through which lubricant may flow to the exterior of said member under the action of centrifugal force when the valve structure is rotated.

24. A rotary valve mechanism for the cylinder of an internal combustion engine comprising a rotary valve structure including a hollow cylindrical member fixed to the outer end portion thereof and adapted to receive the valve rotating force, a casing structure in which said hollow cylindrical member is housed having an inlet and an outlet for lubricant, a bearing ring interposed between radially extending surfaces of said valve and casing structures, and means including passageways formed in said hollow cylindrical member for conducting lubricant from said inlet to the opposing surfaces of said valve and casing structures and said bearing ring and thence to said outlet.

25. A rotary valve apparatus for the cylinder of an internal combustion engine comprising a rotary valve, a hollow cylindrical member adapted to rotate the valve, a casing structure enclosing the hollow cylindrical member and provided with inlet means and outlet means for liquid lubricant, said inlet and outlet means being arranged respectively at the radially internal surface of said hollow cylindrical member and at a radially external portion of said member, and passages for conducting lubricant from said inlet means to said outlet means and to opposing surfaces of the hollow cylindrical member and the casing structure respectively, said passages being so constructed and arranged that any gas seeking to escape from the engine cylinder through the valve apparatus and approaching said outlet means will be obstructed by lubricant forming an hydraulic seal rendered effective by pressure due to centrifugal action.

26. A rotary valve apparatus according to claim 25 wherein said inlet means are so positioned as to deliver lubricant to the interior of the hollow cylindrical member at the end thereof remote from the engine cylinder.

27. A rotary valve apparatus according to claim 25 including a bearing ring interposed between each end of the hollow cylindrical member and the casing structure past which lubricant can flow under the action of centrifugal force on its way to a hydraulic seal.

28. A rotary valve apparatus according to claim 25 wherein the casing structure has on opposite sides of the lubricant outlet means annular grooves, and the hollow cylindrical member is provided with annular flanges extending into said grooves, so that lubricant flowing out past either end of the hollow cylindrical member must, in order to reach the outlet means, pass through the corresponding groove and around the pertinent flange.

29. A rotary valve apparatus according to claim 25 wherein the casing structure comprises an outwardly projecting cylindrical portion fitting between concentric surfaces of the hollow cylindrical member, so that gas seeking to escape between the hollow cylindrical member and the casing structure will be forced to make a hairpin turn around said outwardly projecting cylindrical portion.

30. A rotary valve apparatus according to claim 25 wherein the hollow cylindrical member comprises two concentric parts which are fixed together and the outer of which is a toothed gear, and wherein a bearing ring is interposed between the inner end of said gear and co-operating surfaces of the casing structure, the two parts of the hollow cylindrical member having formed therein connected passages forming a conduit extending from the interior of the hollow cylindrical member to the inner face of said gear, whereby a portion of any lubricant delivered to the interior of the hollow cylindrical member will be forced by centrifugal action through the conduit to and upon the surfaces of said bearing ring.

31. A rotary valve apparatus for the cylinder of an internal combustion engine comprising a valve casing structure adapted to be secured to the engine cylinder and having formed therein inlet and exhaust ports for said cylinder, a hollow cylindrical valve member rotatably mounted in said casing structure and including a skirt for controlling said inlet and exhaust ports, means for rotating said valve member, a bearing member fixed to said casing structure and extending into one end of said hollow cylindrical valve member, and a partition extending transversely to the axis of rotation of said valve member intermediate the ends thereof and sealing off that portion of the interior thereof into which the bearing member extends from that within said skirt which is in direct communication with the engine cylinder.

32. A rotary valve apparatus for the cylinder of an internal combustion engine comprising a valve casing structure adapted to be secured to the engine cylinder and having formed therein inlet and exhaust ports for said cylinder, a hollow cylindrical valve member rotatably mounted in said casing structure and including a skirt for controlling said inlet and exhaust ports, means for rotating said valve member, a bearing member fixed to said casing structure and extending into one end of said hollow cylindrical valve member, a partition extending transversely to the axis of rotation of said valve member intermediate the ends thereof and sealing off that portion of the interior thereof into which the bearing member extends from that within said skirt which is in direct communication with the engine cylinder, and means for supplying lubricant to the opposing surfaces of said valve and bearing members and said casing structure, including means for collecting and maintaining a portion of said lubricant in the form of a hydraulic seal at at least one point in the path along which gases attempt to escape from the engine cylinder around the valve member during the compression stroke.

33. A rotary valve for the cylinder of an internal combustion engine comprising a hollow cylindrical portion adapted to receive an internal bearing, a hollow skirt portion including a flap secured to the remainder of the valve at its leading edge only and adapted to control the inlet and exhaust ports of the cylinder, and a partition extending transversely to the axis of rotation of the valve intermediate the ends thereof and sealing off the interior of said skirt portion from the interior of said hollow cylindrical bearing portion.

GEORGE E. DAVISON.